United States Patent [19]

White et al.

[11] 4,448,552
[45] May 15, 1984

[54] BEARING LUBRICATION SYSTEM

[75] Inventors: William W. White, Glasgow; Ian N. MacDonald, Ayrshire, both of Scotland

[73] Assignee: James Howden & Company Limited, Glasgow, Scotland

[21] Appl. No.: 409,307

[22] Filed: Aug. 18, 1982

[30] Foreign Application Priority Data

Aug. 28, 1981 [EP] European Pat. Off. ........ 81303962.5

[51] Int. Cl.³ .......................... F16C 33/10; F16N 7/14
[52] U.S. Cl. .................................... 384/404; 184/11.1; 184/13.1
[58] Field of Search ............... 384/397, 399, 400, 401, 384/403, 404, 406, 398, 317, 369; 184/11 R, 11 A, 13 R; 308/187

[56] References Cited

U.S. PATENT DOCUMENTS

| | | | |
|---|---|---|---|
| 2,510,544 | 6/1950 | Buchi | 384/398 |
| 2,606,796 | 8/1952 | Helms | 384/404 |
| 2,884,284 | 4/1959 | Bohn | 384/404 |
| 3,635,311 | 1/1972 | Kaufman | 384/404 X |
| 3,635,312 | 1/1972 | Kaufman | 384/404 X |
| 3,635,578 | 1/1972 | Wagner | 384/404 X |
| 4,327,950 | 5/1982 | Czuszak | 384/404 |

FOREIGN PATENT DOCUMENTS

| | | |
|---|---|---|
| 201372 | 12/1958 | Austria . |
| 1053252 | 3/1959 | Fed. Rep. of Germany . |
| 1794481 | 8/1959 | Fed. Rep. of Germany . |
| 254336 | 12/1948 | Switzerland . |
| 1039522 | 8/1966 | United Kingdom . |

Primary Examiner—Stuart S. Levy
Assistant Examiner—David Werner
Attorney, Agent, or Firm—Barnes & Thornburg

[57] ABSTRACT

A bearing, particularly a heavy duty bearing, in which lubrication is effected by lubricant being picked up on a disc (27,28) mounted on the bearing shaft (21), the disc having, at its periphery, an axially extending ring (35) on the inner and outer surface of which the lubricant forms a film. During start-up, lubricant on the outer surface is scraped off by an external scraper (57) and falls under gravity onto the bearing surface and as the speed increases, lubricant on the inner surface is picked up by a scoop (38,39) to produce a pressure head sufficient to pump the lubricant to a reservoir from which it flows to the bearing surface under gravity. The lubricant is pumped to the reservoir through an external cooler (62) and an external filter (66).

11 Claims, 4 Drawing Figures

BEARING LUBRICATION SYSTEM

DESCRIPTION

The present invention relates to bearings, and in particular to heavy duty bearings which may, by way of example, be used for heavy duty fans. The bearing could, of course, be used in a multitude of other environments.

Various proposals have been made for lubricating bearings. One commonly used in heavy duty work is to have a pump which withdraws lubricant from a sump as it leaves the bearing, and pumps the lubricant via a filter and a cooler before it is reintroduced into the bearing surfaces. Such a construction is satisfactory from a practical point of view, but is very expensive, the pump and external cooler and filter usually costing more than the remainder of the bearing.

Other proposals have been made in which a lubricating disc is mounted on a shaft. This lubricating disc is dipped into a sump and picks up a film of the lubricant which is scraped off and falls under gravity onto the bearing surface, from which it flows to the sump. Various proposals have been made to cool the sump but none of these has proved particularly satisfactory. Furthermore, the berarings of this type provide no filtration of the lubricant. The actual construction of these discs has taken many forms, being either a plain disc with a scraper on the periphery of the disc e.g. as shown in U.S. Pat. No. 3,635,578 and DAS 1053252, or a disc having an axially extending peripheral wall e.g. as shown in U.S. Pat. Nos. 3,635,311 and 3,635,312; U.K. Pat. No. 1039522 or Swiss Pat. No. 254336. The scraper is either mounted on the exterior or the interior of this peripheral wall but in neither case does a fully satisfactory bearing result.

It is now proposed, according to the present invention, to provide a bearing comprising a fixed part having a bearing surface, a shaft rotatable in the bearing surface, a radially extending disc mounted on the shaft for rotation therewith, an axially extending ring mounted on said disc at a location spaced radially from the shaft, a lubricant reservoir, means to feed lubricant from the reservoir to said bearing surface, means to lead lubricant from said bearing surface to the vicinity of the lower part of said ring, a lubricant scoop mounted within said ring and closely adjacent thereto and a closed conduit leading from said pick-up to said reservoir, the scoop being so shaped whereby, upon rotation of said shaft, a film of lubricant is formed on the inner surface of said ring, this film being picked up by said scoop to produce a pressure head sufficient to pump lubricant to said reservoir.

Such an arrangement has several advantages. By providing the scoop in such a way that it can produce a pressure head, it is possible firstly to pump the lubricant to the reservoir and for the reservoir itself to feed the bearing surface and shaft by gravity. Now this is most important because it enables the bearing to draw only that amount of lubricant which it requires which means that the disc is not always immersed in a deep volume of lubricant. In the prior construction of this general type, where no pressure head was induced but the disc merely picked up the lubricant and deposited it to the bearing by gravity, there was always far more lubricant than was necessary in circulation and this required more effort and therefore an increase in the heat which had to be disposed of, and also, incidentally, a significant waste in energy.

Secondly by providing a pressure head, it is possible to pump the lubricant to the reservoir via a lubricant filter and/or a lubricant cooler. These can each produce a significant improvement in the performance of the lubrication of the bearing.

The scoop can take a number of forms, but in one preferred construction it comprises a scroll having its axis parallel to the shaft axis; and a co-operating wall spaced inwardly of the scroll and forming therewith a mouth directed to pick up lubricant as the shaft rotates and lead it to said conduit.

Since the bearing should be capable of operating in either rotational direction, the scoop preferably further comprises a second similar scroll having its axis parallel to the shaft axis and a second co-operating wall spaced inwardly of the second scroll and forming therewith a second mouth directed in the opposite direction to the mouth of the first scroll, to pick up lubricant as the shaft rotates in the opposite direction and to lead the lubricant to said conduit. A one way valve should be provided between each mouth and the conduit to prevent lubricant from flowing in the reverse direction towards either of the mouths when the other mouth is operational to pick up the lubricant. This one way valve will normally be in the form of a ball valve.

The form of scoop referred to above is particularly simple to make and can produce a significant pressure head. The effect of this can be increased if the channel formed between the scroll or scrolls and its associated co-operating wall is of increasing cross-section so that the static pressure induced is increased as the lubricant flows towards the closed conduit.

The construction so far described is very satisfactory to produce a pressure head when the shaft is rotating at a reasonable velocity. Of course the bearing needs to be lubricated from start-up and a scraper is advantageously mounted adjacent the external surface of the ring near the upper part thereof to scrape lubricant from the external surface, means being provided to feed lubricant from the scraper directly to the bearing surface under gravity. This scraper, then, will be operational at low rotational speed.

Bearing of this general type are known in which the fixed part of the bearing comprises an outer keep forming part of a casing of the bearing, the outer keep having an inner part-spherical surface, a shell having an outer part-spherical surface cooperating with the part-spherical surface of the outer keep, the shell having the bearing surface thereon. This enables the bearing to be self-aligning and facilitates the assembly of the bearing. The construction of the present invention preferably includes this self-aligning facility and the or each scoop and/or the scraper (where it is provided) are preferably mounted on the shell. This enables the scoop or scoops and the scraper themselves to be self-aligned with the ring of the disc so that the correct clearance therewith is ensured and is maintained even if the bearing is subject to considerable changes in temperature.

Both the scrolls and the scraper are preferably mounted on a common member carried by the shell and this common member has an aperture therethrough to feed the lubricant from the scraper directly to the bearing surface.

Advantageously the means to lead the lubricant from the bearing surface include a member which extends within the lower part of the ring so that the lubricant is fed directly into the interior of the ring. With this arrangement the size of the sump can be significantly reduced and there will be little tendency for the lubricant to reach the exterior surface of the ring when the bearing is moving at speed.

For ease of manufacture, the disc is preferably formed of at least two parts (usually split along a diameter) and each part has, at its radially inner zone, a part-annular hub portion. This hub portion can be fitted into a central annular recess in the end of the shaft so as to be engaged therein, and bolts, or the like, can be provided to secure these hub portions in the recess. The peripheral rim of the shaft surrounding the recess will then assist in retaining the two parts of the disc in place, even at high speed.

In order that the present invention may more readily be understood, the following description is given, merely by way of example, reference being made to the accompanying drawings, in which:-

Figure 1:
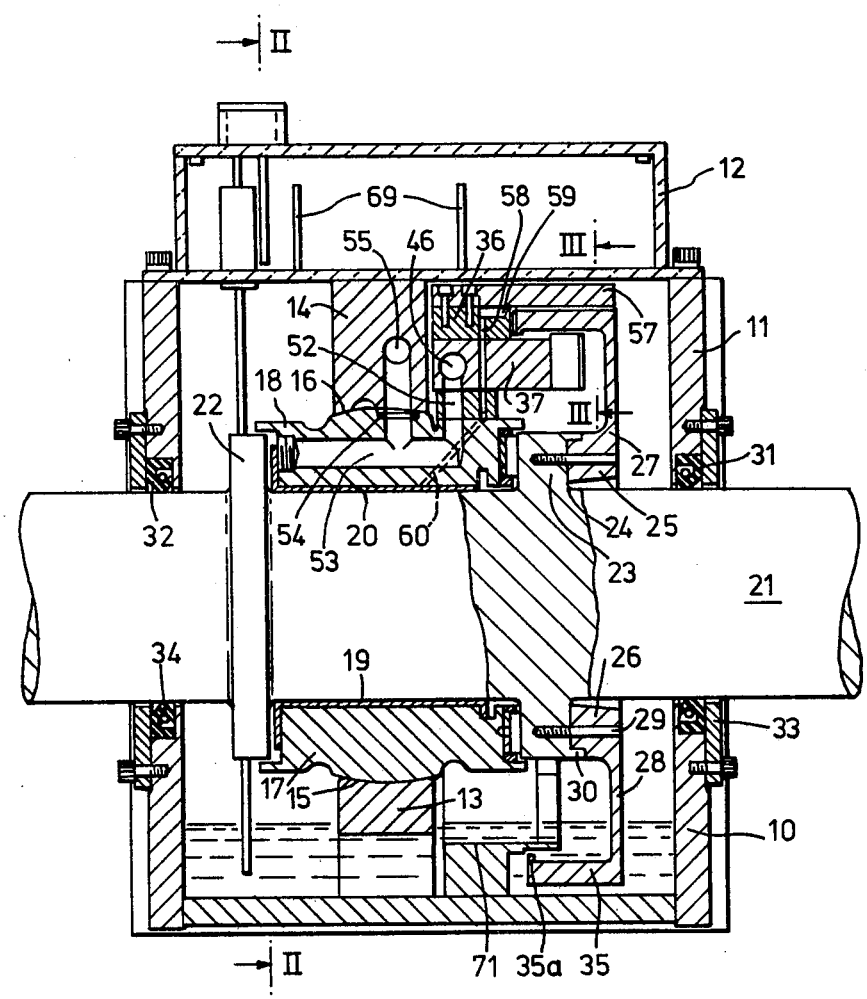
FIG. 1 is a cross-section through one embodiment of bearing according to the present invention.

Referring to the drawings the bearing illustrated therein comprises a lower casing half 10 having bolted thereon an upper casing half 11 surmounted by a lubricant reservoir 12. Mounted on the casing parts are lower and upper outer fixed parts or keeps 13 and 14 of the bearing, these having part-spherical inner surfaces 15 and 16 which co-operate with part-spherical surfaces on shell halves 17 and 18. The inner surfaces of the shell halves have conventional white metal bearing shells 19 and 20 forming bearing surfaces for the shaft 21 which has radially extending rims 22 and 23, thus providing a self-aligning bearing of a conventional type. The right hand surface of the rim 23 has a central annular recess 24 formed therein in which is located the two radially inner hub parts 25, 26 of disc halves 27 and 28 respectively. These disc parts are secured by bolts 29 which extend through the hub parts 25, 26 and into the rim 23. The recess 24 leaves a peripheral rib 30 into which the hub parts 25 and 26 are snugly engaged to reduce any tendency for the disc parts to fly out during high speed operation.

At the axial ends, the bearing is provided with seals 31 and 32 held in place by seal plates 33 and 34. At its outer periphery the disc 28 carries an axially inwardly extending ring 35 having a lip 35A at its inner axial end.

The shell 18 carries, on the side of the keep 14 facing the disc 28, a support member 36 which carries a scoop assembly 37 which extends within the ring 35. This scoop assembly includes two oppositely curved scrolls 38 and 39 which have their axes substantially parallel to the axis of the shaft 21. The scrolls include wall portions 40 and 41 radially spaced from the outermost part of the scroll to provide two oppositely directed mouths 42 and 43. The two channels 44 and 45 formed between the outermost part of each scroll and the wall portions 40 and 41 are of increasing cross-section as they lead away from the mouth 42 and 43.

Figure 2:
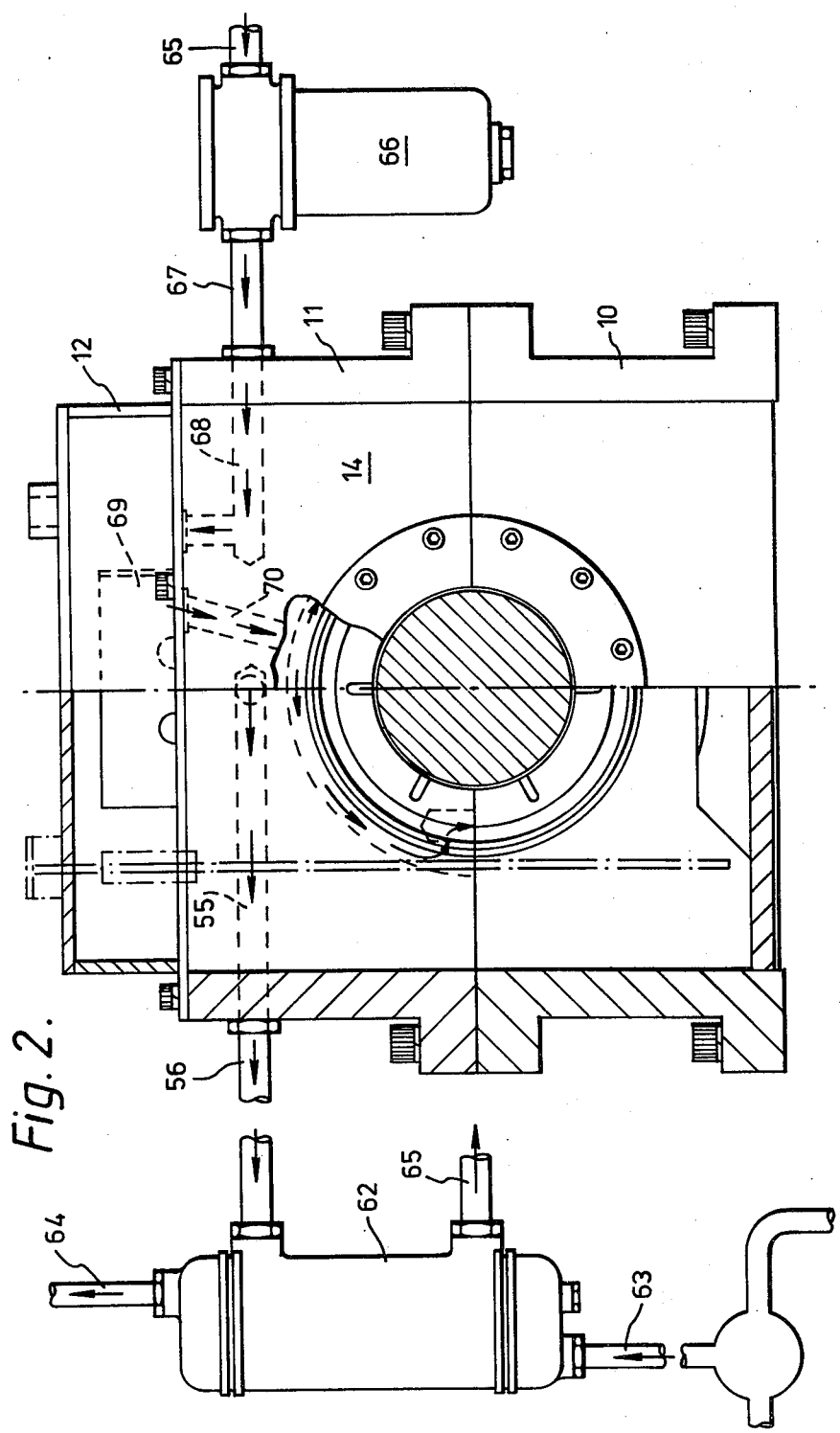
FIG. 2 is an end elevation, partly in section along the line II—II of FIG. 1.
Figure 3:
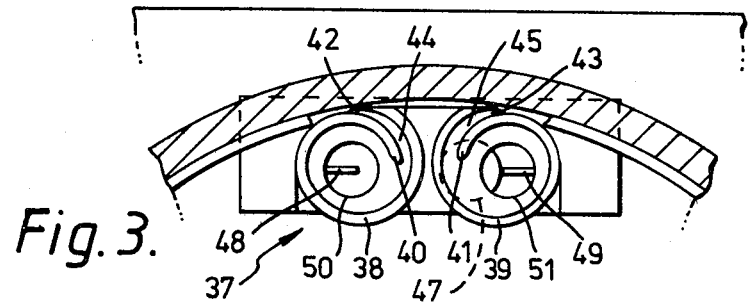
FIG. 3 is an enlarged section taken along the line III—III of FIG. 1.
Figure 4:
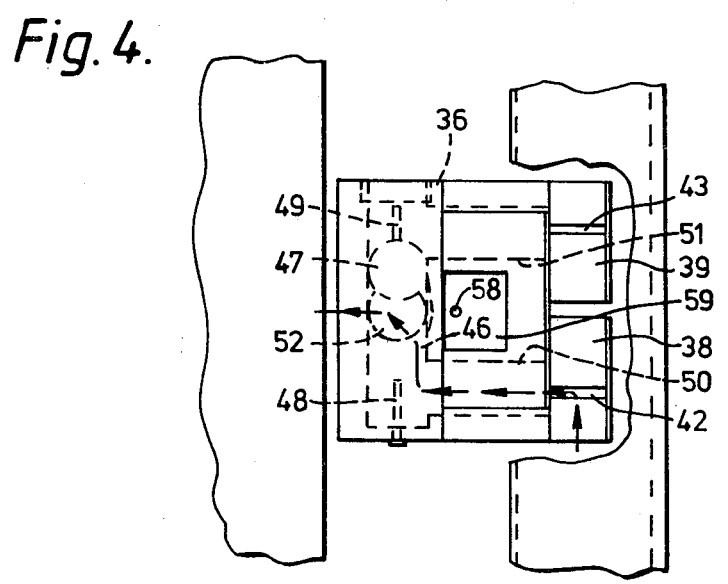
FIG. 4 is a fragmentary top plan of the scoop assembly of FIG. 3 with the scraper omitted for clarity.

The member 36 has a transverse bore 46 (FIG. 4) therein which accommodates a valve ball 47, extreme positions of which are determined by stoppers 48 and 49 located in longitudinal bores 50 and 51 in the member 36 and communicating with the interior of the scrolls 38 and 39. The transverse passage 46 connects directly to a closed conduit 52 which leads, via a bore 53 provided with O-ring 54, to a duct 55 in the keep 14. This duct leads out of a side of the bearing and communicates with an outlet pipe 56 (FIG. 2).

Also mounted on the member 36 is a scraper 57 which rubs on the external surface of the ring 35 to scrape the lubricant therefrom. The lubricant so scraped is led to an aperture 58 in the member 36 and thence into a trough 59 and finally via radial bores 60 to the bearing surface 20.

Referring again to FIG. 2, the outlet pipe 56 communicates with an oil/water cooler 62 having a cool water inlet 63 and a warm water outlet 64 as well as an oil outlet 65. The cooler 62 is of a conventional design and further discussion is not deemed necessary. The outlet pipe 65 is also the inlet pipe of an oil filter 66 seen on the right hand side in FIG. 2. Oil leaving the filter flows via a conduit 67 to a further conduit 68 in the keep 14 which connects with the reservoir 12. It will be seen that this reservoir includes a number of baffles 69 which are used to reduce the foam in the reservoir and at its bottom the reservoir 12 has an outlet duct 70 which communicates with the aperture 58 so that oil or other lubricant may flow from the reservoir via this and the bore 60 to lubricate the bearing surfaces.

Below the member 36 and under the shaft is a member 71 which extends into the space above the ring 35.

In operation, when the shaft starts to turn, there will be some lubricant in the bottom of the lower casing part 10; a film of lubricant is formed both on the inside surface and the exterior surface of the ring 35. The scraper 57 removes some of this film and allows lubricant to flow via aperture 58 trough 59 aperture 60 to lubricate the bearing. As the speed increases, lubricant on the inner surface of the ring 35 will be picked up by the appropriate one of the scrolls 38, 39, depending upon the direction of rotation, and this will produce a body of lubricant within the scroll the pressure of which will increase as the speed increases. This will produce a pressure head which will firstly move the ball 47 to close the other one of the ducts 50, 51 which is not being used and thence prevent lubricant from being sucked out by the other scroll. The lubricant will then flow via conduit 52 and pipe 53 into conduit 55 by which it will flow via the cooler 62 and filter 66 to the reservoir. Soon a body of liquid will be produced in the reservoir and it will flow via duct 70 to the bearing surfaces. The hot lubricant will flow out of the bearing surfaces into the bottom casing part and the majority of it will be caught by the member 71 and fed directly into the interior of the ring 35.

It will be appreciated that the amount of lubricant which will be drawn from the reservoir will be determined by the bearing surface and shaft themselves so that no excess of lubricant will circulate. Furthermore, the lubricant will always be clean and can readily be cooled in the cooler 62.

We claim:
1. A bearing comprising, in combination;
   A. A fixed part having a bearing surface;
   B. A shaft rotatable in the bearing surface;
   C. A radially extending disc mounted on the shaft for rotation therewith;
   D. An axially extending cylindrical ring mounted on said disc at a location spaced radially from the shaft;

E. A lubricant reservoir;
F. Means to feed lubricant from the reservoir to said bearing surface;
G. Means to lead lubricant from said bearing surface to the vicinity of the lower part of said ring;
H. A lubricant scoop mounted within said ring and closely adjacent to the internal cylindrical surface thereof;
I. A closed conduit leading from said scoop to said reservoir, said closed conduit being fully closed to atmosphere from said scoop to said reservoir; and
J. Said scoop being so-shaped whereby, upon rotation of said shaft, a film of lubricant is formed on inner surface of said ring, to move at substantially the same velocity as said ring, this film being picked up at said velocity by said scoop to produce a pressure head in said closed conduit sufficient to pump lubricant to said reservoir.

2. A bearing as claimed in claim 1, and further comprising a lubricant filter in said closed conduit and wherein said pressure head is sufficient to pump lubricant to said reservoir via said filter.

3. A bearing as claimed in claim 1, and further comprising a lubricant cooler in said closed conduit and wherein said pressure head is sufficient to pump lubricant to said reservoir via said cooler.

4. A bearing as claimed in claim 1, wherein said scoop comprises a scroll having its axis parallel to the shaft axis and a cooperating wall spaced inwardly of the scroll and forming therewith a mouth directed to pick up lubricant as the shaft rotates and to lead it to said conduit.

5. A bearing according to claim 4, wherein said scoop further comprises a second similar scroll having its axis parallel to the shaft axis and a second cooperating wall spaced inwardly of said scroll and forming therewith a second mouth directed in the opposite direction to the mouth of the first scroll, effective to pick up lubricant as the shaft rotates in the opposite direction and to lead the lubricant to said conduit, and further comprising a valve beween each mouth and the conduit to prevent lubricant from flowing in the reverse direction towards either of the mouths.

6. A bearing as claimed in claim 4, wherein the channel formed between the or each scroll and its cooperating wall is of increasing cross-section effective to induce an increase in static pressure as the lubricant flows to the closed conduit.

7. A bearing as claimed in claim 1, and further comprising a scraper mounted adjacent the external surface of the ring near the upper part thereof, to scrape lubricant from said external surface and means to feed lubricant from said scraper directly to said bearing surface under gravity.

8. A bearing as claimed in claim 7, wherein said fixed part of the bearing comprises an outer keep forming part of the casing of the bearing, the outer keep having an inner part-spherical surface, a shell having an outer part-spherical surface cooperating with the part-spherical surface of the outer keep, the shell having the bearing surface thereon, whereby the bearing is self-aligning said said scoop is mounted on the shell.

9. A bearing as claimed in claim 8, wherein said scoop and the scraper are mounted on a common member having an aperture therethrough to feed lubricant from the scraper to the bearing surface.

10. A bearing as claimed in claim 1, wherein the means to lead the lubricant from the bearing surface include a member extending within the lower part of the ring to feed the lubricant directly into the interior of the ring.

11. A bearing as claimed in claim 1, wherein the disc is formed of at least two parts, each having, at its radially inner zone, a part-annular hub portion, and wherein a radial surface on the shaft has a cooperating annular recess in which are engaged the pat-annular hub portions.

* * * * *

UNITED STATES PATENT AND TRADEMARK OFFICE
CERTIFICATE OF CORRECTION

PATENT NO. : 4,448,552

DATED : May 15, 1984

INVENTOR(S) : William W. White and Ian N. MacDonald

It is certified that error appears in the above-identified patent and that said Letters Patent is hereby corrected as shown below:

Column 1, line 27, delete "berarings" and insert --bearings-- therefor;

Column 6, line 23, delete "said", first occurrence, and insert --and-- therefor; and Column 6, line 37, delete "pat" and insert --part-- therefor.

Signed and Sealed this

Twelfth Day of February 1985

[SEAL]

Attest:

DONALD J. QUIGG

*Attesting Officer*  *Acting Commissioner of Patents and Trademarks*